(12) United States Patent
Lim

(10) Patent No.: US 7,767,978 B1
(45) Date of Patent: Aug. 3, 2010

(54) ULTRAVIOLET WATER TREATMENT DEVICE

(76) Inventor: William Lim, 11095 Inland Ave., Mira Loma, CA (US) 91752

( * ) Notice: Subject to any disclaimer, the term of this patent is extended or adjusted under 35 U.S.C. 154(b) by 522 days.

(21) Appl. No.: 11/709,111

(22) Filed: Feb. 20, 2007

(51) Int. Cl.
*C02F 1/32* (2006.01)
(52) U.S. Cl. .................. 250/436; 250/428; 250/435; 250/437; 250/504 R; 210/232; 210/234
(58) Field of Classification Search ............... 250/428, 250/435, 436, 437, 504 R; 210/232, 234
See application file for complete search history.

(56) References Cited

U.S. PATENT DOCUMENTS

| | | | | |
|---|---|---|---|---|
| 3,884,532 | A * | 5/1975 | Deschenes | 303/22.7 |
| 4,141,830 | A * | 2/1979 | Last | 210/748.12 |
| 4,535,247 | A * | 8/1985 | Kurtz | 250/436 |
| 4,983,307 | A * | 1/1991 | Nesathurai | 210/748 |
| 5,597,482 | A | 1/1997 | Melyon | |
| 5,725,757 | A * | 3/1998 | Binot | 210/85 |
| 5,853,572 | A | 12/1998 | Kuennen et al. | |
| 5,942,110 | A | 8/1999 | Norris | |
| 6,099,799 | A * | 8/2000 | Anderson | 210/748.11 |
| 6,614,039 | B2 * | 9/2003 | Hollander | 250/504 R |
| 6,793,817 | B2 * | 9/2004 | Kuennen et al. | 210/232 |
| 6,905,230 | B2 | 6/2005 | Schmitkons | |
| 7,049,615 | B1 * | 5/2006 | Browne | 250/504 R |
| 7,476,870 | B2 * | 1/2009 | Hopaluk et al. | 250/436 |
| 7,638,778 | B2 * | 12/2009 | Chen | 250/455.11 |
| 7,662,276 | B2 * | 2/2010 | Larsson | 210/85 |
| 2002/0096648 | A1 * | 7/2002 | Kaiser et al. | 250/492.1 |
| 2005/0133431 | A1 * | 6/2005 | Schulz | 210/256 |
| 2005/0133459 | A1 * | 6/2005 | Schulz | 210/748 |
| 2007/0051901 | A1 * | 3/2007 | Hopaluk et al. | 250/436 |

FOREIGN PATENT DOCUMENTS

EP 0 940 630 A2 9/1999

\* cited by examiner

*Primary Examiner*—Bernard E Souw
*Assistant Examiner*—Michael J Logie
(74) *Attorney, Agent, or Firm*—Carr & Ferrell LLP

(57) ABSTRACT

An ultraviolet (UV) water treatment device includes a housing with an inlet and an outlet. Water flows into the housing through the inlet, is exposed to the UV light, and the treated water then flows out of the housing through the outlet. The UV light source is inserted into a quartz tube from above so that the UV lamp can be changed without draining the system. A lower access port is provided in the bottom of the housing. The lower access port includes a seat that contains the lower end of the quartz tube, and further allows a user of the system to remove debris from a broken quartz tube quickly and safely.

6 Claims, 2 Drawing Sheets

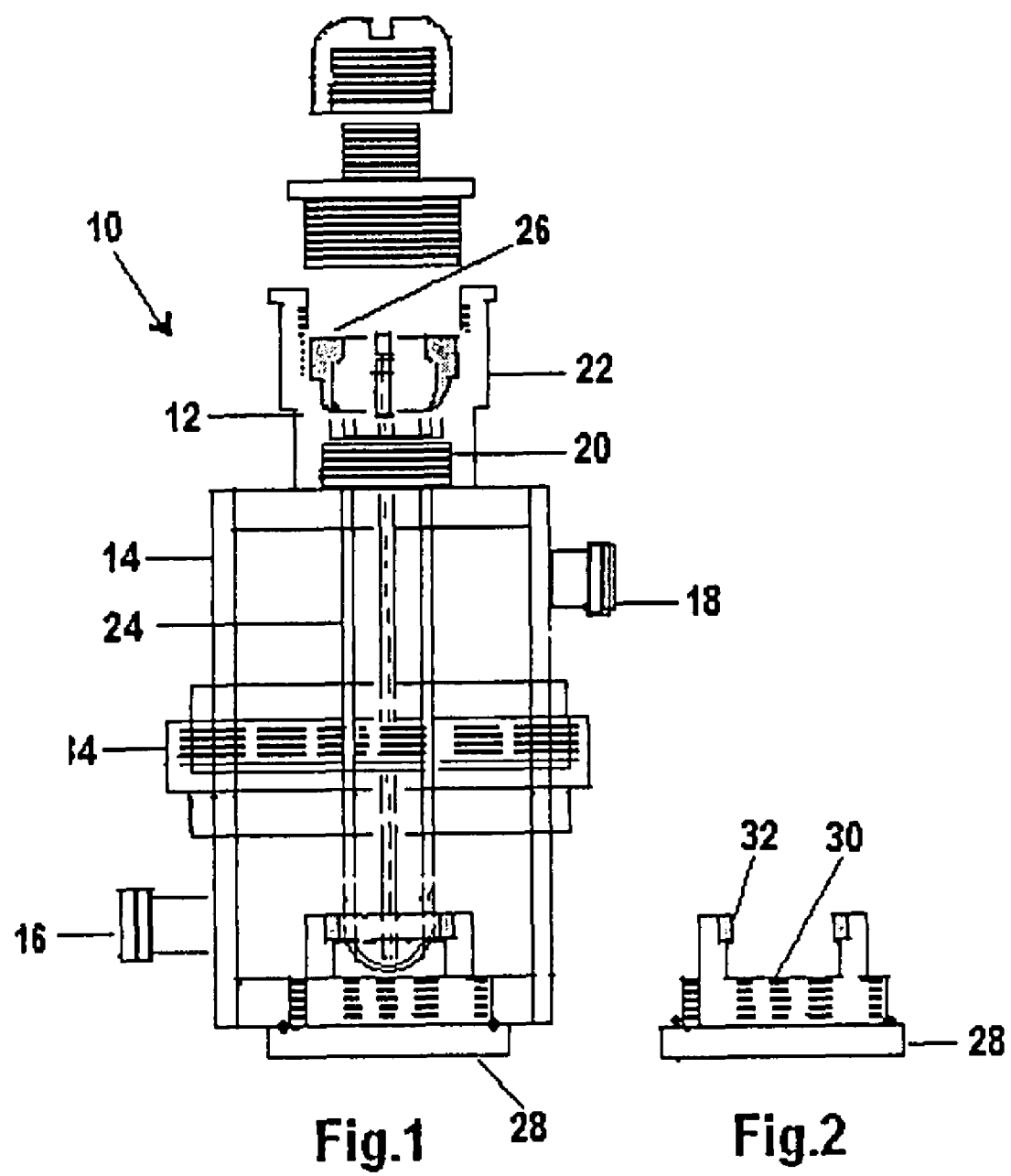

ULTRAVIOLET WATER TREATMENT DEVICE

BACKGROUND OF THE INVENTION

1. Field of the Invention

The present invention relates generally to water treatment devices, and more particularly is a water treatment device that uses an ultraviolet lamp and includes means to easily and safely change the quartz tubes used in the device.

2. Description of the Prior Art

One of the chief concerns in any closed water system is the growth of unwanted bacteria and algae. Even when the water is continuously circulated and filtered, bacteria and algae are likely to eventually foul the water. In display applications, such as fish tanks or koi ponds, when fouled water ruins the aesthetics of the system, the system is rendered valueless. Therefore many approaches have been developed to combat the growth of unwanted bacteria and algae in closed water systems. One of the most effective methods of killing unwanted organisms is exposing the water in a system, and the organisms in the water, to ultraviolet (UV) light radiation. UV radiation effectively eliminates any bacteria or algae in the water. The use of UV in a water treatment system reduces the need for chemical control of water quality in the system.

In order for a UV sterilization system to function, the water in the system must pass by a source of UV light. This is typically accomplished by placing a UV light source, an ultraviolet lamp, in an enclosed sterilization chamber. As the water passes through the sterilization chamber, the UV light kills the unwanted bacteria and algae.

There are many prior art references that disclose UV sterilization methods. One example is the "Water Purification Apparatus" of Melyon, U.S. Pat. No. 5,597,482, issued Jan. 28, 1997. Another is the "UV Lamp Retainer System" of Schmitkons, U.S. Pat. No. 6,905,230, issued Jun. 14, 2005. Other related publications and patents include the "Quick Change Lamp Block System" of Celentano, et al., European Publication No. EP 0 940 630 A2, published Sep. 8, 1999; the "Apparatus for Ultraviolet Disinfection of Water" by Anderson, U.S. Pat. No. 6,099,799, issued Aug. 8, 2000; the "Water Treatment Apparatus" of Norris, U.S. Pat. No. 5,942,110, issued Aug. 24, 1999; and the "Home Water Purification System" of Kuennen, et al., U.S. Pat. No. 5,853,572 issued Dec. 29, 1998.

An inherent problem with the prior art systems is that the UV light bulb periodically requires replacement, either due simply to the end of its useful life, or to breakage. Replacement of the bulb is made through a top mounted connection, so that the water in the system need not be drained every time the UV lamp bulb needs to be replaced. However, when the enclosing tube surrounding the UV lamp is broken, the top access poses problems for the operator. The operator must reach inside the housing, and with limited visibility and access, remove the broken glass and replace the enclosing tube. This operation is not very convenient, and poses a safety risk to the operator in that broken glass must be handled from awkward positions.

Accordingly, it is an object of the present invention to provide a UV sterilization system that provides for quick and easy replacement of the UV bulb.

It is another object of the present invention to provide a system that utilizes a bulb mounting method that enables the operator to safely change a broken bulb.

SUMMARY OF THE INVENTION

The present invention is a water treatment device. The device uses one or more ultraviolet (UV) lamps to kill bacteria and algae in the water. The device includes a housing with an inlet and an outlet. Water flows into the housing through the inlet, is exposed to the UV light, and the treated water then flows out of the housing through the outlet.

The UV light source is enclosed within a quartz tube. A quartz tube is required so that the wavelength of the UV light passing through the enclosure is not altered, which would render the light ineffective. Quartz has excellent UV transmittance properties (typically around 95%) so that the output of the UV light source is maximized. The quartz tube is positioned within the housing of the device. The UV lamp is inserted into the quartz tube from above so that the UV lamp can be changed without draining the system.

A lower access port is provided in the bottom of the housing. The lower access port contains the lower end of the quartz tube. The provision of the lower access port allows a user of the system to remove debris from a broken quartz tube (a common occurrence) quickly and safely.

An advantage of the present invention is that the UV lamp can be replaced without draining the system.

Another advantage of the present invention is that a broken enclosure tube can be removed from the lower end of the housing, allowing the debris to be removed mostly by gravity, and not requiring the user to reach into the housing.

These and other objects and advantages of the present invention will become apparent to those skilled in the art in view of the description of the best presently known mode of carrying out the invention as described herein and as illustrated in the drawings.

BRIEF DESCRIPTION OF THE DRAWINGS

FIG. 1 is a sectional view of the UV water treatment device of the present invention.

FIG. 2 is a sectional view showing the lower access port element removed from the housing.

DETAILED DESCRIPTION OF THE INVENTION

Figure 3:
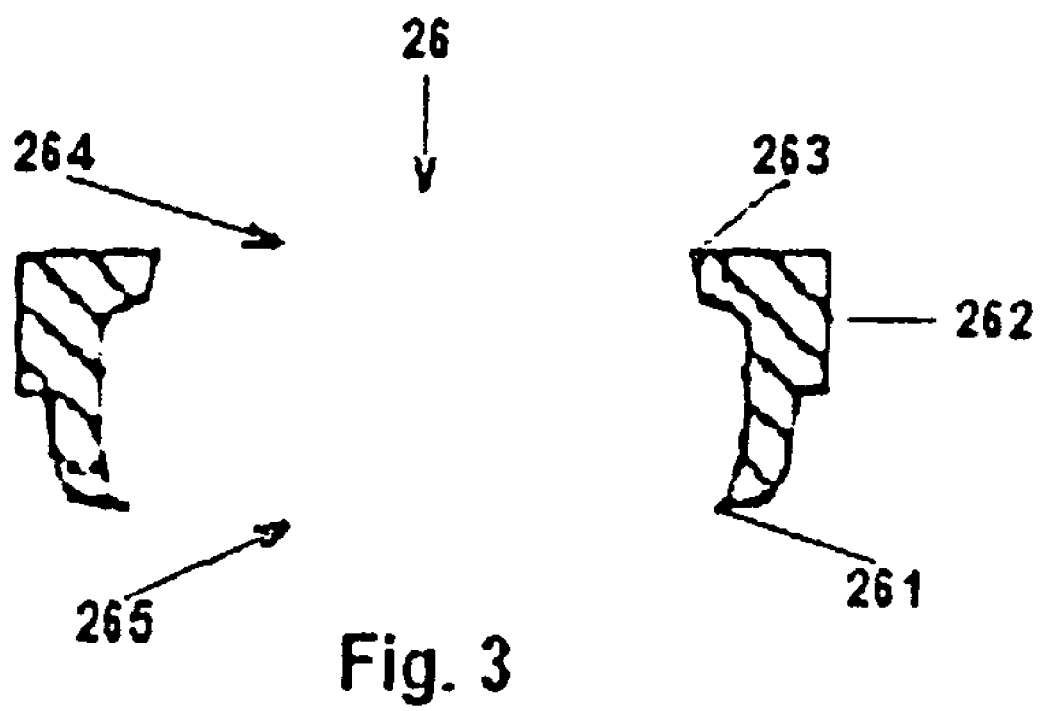
FIG. 3 is a sectional view of the silicone seal.

The present invention is an ultraviolet (UV) water treatment device 10. The water treatment device 10 uses an ultraviolet light source 12 to kill bacteria and algae in the water, typically in a display system such as a fish tank or koi pond. The light source 12 is typically one or more UV lamps. In certain applications where additional sterilizing capability is required, multiple UV lamps 12 might be utilized in the device. Similarly, in some large volume applications, multiple units of the device 10 might be installed in sequence.

The UV water treatment device 10 includes a housing 14 with an inlet 16 and an outlet 18. Water in the system flows into the housing 14 through the inlet 16, where it is exposed to the UV light from the lamp 12. The UV light kills the bacteria and algae in the water, and the treated water then flows out of the housing 14 through the outlet 18. The housing 14 of the UV water treatment device 10 is generally constructed from either stainless steel or PVC (though many other materials would suffice), depending on the requirements of a given installation. Economic considerations make the PVC embodiment the most widely used. Other considerations include the fact that the housing material must be rated for potable water. If a plastic material is chosen, it must include UV inhibitors.

A threaded nipple 20 extends from a top surface of the housing 14. A clear plastic coupling 22 is threaded on to the nipple 20. The clear plastic of the coupling 22 allows the user to see when the UV lamp 12 is on. An upper end of a quartz tube 24 that receives the UV lamp 12 is seated in a lower end of the coupling 22. The power supply for the UV lamp 12 is connected at an upper end of the coupling 22. The quartz tube 24 is oriented with its open top at a top side of the housing 14 to facilitate "drop-in" installation of the UV lamp 12.

A special silicone seal 26 is installed at the junction of the nipple 20 and the clear plastic coupling 22 to ensure a watertight connection and to provide a seat for the upper end of the quartz tube 24. The seal 26 is formed from silicone to ensure that the seal 26 remains soft and pliable in order to cushion the quartz tube 24. The silicone seal 26 comprises a main body 261 with an enlarged shoulder 262. When the silicone seal 26 is placed in the nipple 20, the shoulder 262 contacts the upper end of the nipple 20 so that the seal 26 is fixed in position. The outer diameter of the seal 26 cannot be larger than that of the nipple 22, so that the plastic coupling 22 can fit over the silicone seal 26. A protruding lip 263 on the interior of a top side of the seal 26 gives the upper opening 264 of the seal 26 a smaller diameter than that of the lower opening 265. When the quartz tube 24 is inserted into the lower opening 265 of the seal 26, the lip 263 ensures that the quartz tube 24 cannot be forced too far upward. The lower end of the main body 261 is tapered slightly outward so that the seal 26 is less likely to have excessive adherence to the interior of the nipple 20.

A lower access port 28 is provided in the bottom of the housing 14. The lower access port 28 is removably installed in the housing 14. While any sealable means of installation will suffice, the lower access port 28 is typically secured in the housing 14 by mating threads supplemented by an O-ring to eliminate leakage. The installation means should allow easy removal of the port 28 without the use of any specialized tools. The lower access port 28 comprises a seating cup 30 that receives the lower end of the quartz tube 24. A soft, flexible cushioning seat 32 provides a shock absorbing surface on which the lower end of the quartz tube 24 rests. With the provision of the easily removable lower access port 28, the water treatment device 10 of the present invention provides the user of the system with a way to quickly and safely remove debris from the device. This feature is especially useful when removing a broken quartz tube 24, a task that is frequently required.

Installation of the UV water treatment device 10 at a given location is facilitated by a union 34 installed in a middle section of a main body of the housing 10. The union 34 allows the lower end of the housing 14, the end below the union 34, to be rotated 360° relative to the upper end of the housing 14. This means that the inlet 16 can be rotated 360° relative to the outlet 18 so as to be compatible with the conformation of inlet and outlet lines of any existing plumbing.

The above disclosure is not intended as limiting. Those skilled in the art will readily observe that numerous modifications and alterations of the device may be made while retaining the teachings of the invention. Accordingly, the above disclosure should be construed as limited only by the restrictions of the appended claims.

I claim:

1. A water treatment device comprising:
    a housing situated in a filtering system, the housing having at least one inlet to allow water to flow into the housing and at least one outlet to allow water to flow out of the housing;
    a quartz tube mounted in the housing, the quartz tube including at least one ultraviolet light source positioned therein; and
    a lower access port in a bottom side of the housing, wherein
    a top side of the housing allows for insertion of the ultraviolet light source into the quartz tube, and the lower access port allows access to a lower end of the quartz tube for maintenance and removal of debris, the access being provided with the housing remaining in an operable position in the filtering system, electrical and plumbing connections being made at positions removed from the lower access port.

2. The water treatment device of claim 1, further comprising a silicone seal is located between a nipple on the top side of the housing and a coupling affixed to the nipple.

3. The water treatment device of claim 2, wherein the coupling is made of clear plastic to allow visual confirmation of operation of the ultraviolet light source.

4. The water treatment device of claim 2, wherein the silicone seal includes:
    a main body with a tapered lower end,
    a shoulder area at an upper end of the main body, the shoulder area having an outer diameter larger than that of a lower end of the main body, and
    a protruding lip extending into a central opening of the seal at a top side thereof, wherein a power supply connection for the ultraviolet light source is inserted into a top side of the silicone seal through the central opening, and an upper end of the ultraviolet light source is inserted into a lower end of the silicone seal, the protruding lip preventing upward displacement of the ultraviolet light source.

5. The water treatment device of claim 1, wherein the lower access port includes a seating cup to receive a lower end of the ultraviolet light source.

6. A water treatment device comprising:
    a housing situated in a filtering system, the housing having at least one inlet to allow water to flow into the housing and at least one outlet to allow water to flow out of the housing;
    a quartz tube mounted in the housing, the quartz tube including at least one ultraviolet light source positioned therein;
    a lower access port in a bottom side of the housing, the lower access port including a seating cup to receive a lower end of the ultraviolet light source, the lower access port allowing access to a lower end of the quartz tube for maintenance and removal of debris, the access being provided with the housing remaining in the operable position in the filtering system, electrical and plumbing connections being made at positions removed from the lower access port; and
    a silicone seal located between a nipple on the top side of the housing and a coupling that is affixed to the nipple, the coupling being made of clear plastic to allow visual determination of operation of the ultraviolet light source, wherein the silicone seal includes a main body with a tapered lower end and a shoulder area with an outer diameter larger than that of the lower end of the main body, and a protruding lip extending into a central opening of the seal at a top side thereof so that a power supply connection for the ultraviolet light source is inserted into a top side of the silicone seal through the central opening, and an upper end of the ultraviolet light source is inserted into a lower end of the silicone seal, the protruding lip preventing upward displacement of the ultraviolet light source.

\* \* \* \* \*